Nov. 1, 1927.
A. B. WELLS
LENS
Filed March 22, 1923
1,647,721
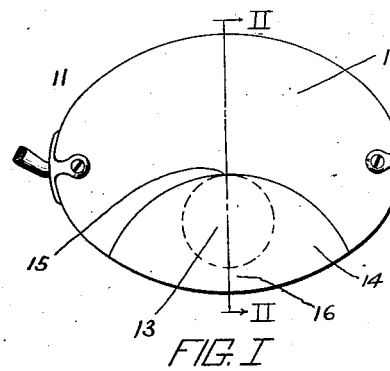
FIG. I
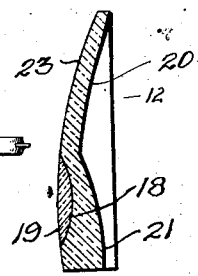
FIG. II
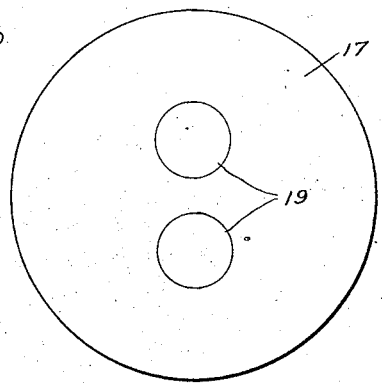
FIG. III
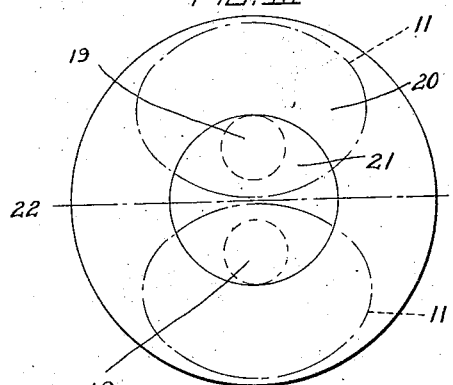
FIG. IV
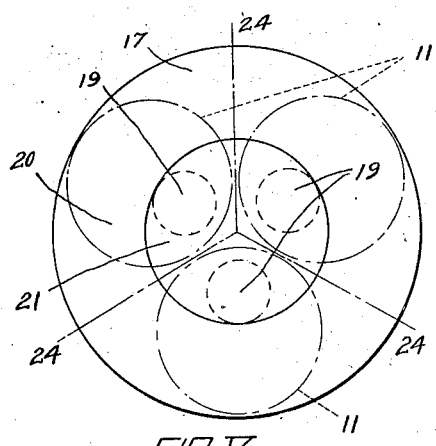
FIG. V
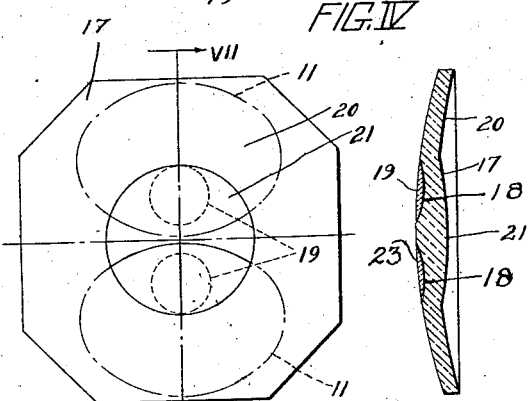
FIG. VI
FIG. VII
INVENTOR
A. B. WELLS
BY
Harry H. Styll
ATTORNEY Patented Nov. 1, 1927.

1,647,721

UNITED STATES PATENT OFFICE.

ALBERT B. WELLS, OF SOUTHBRIDGE, MASSACHUSETTS.

LENS.

Application filed March 22, 1923. Serial No. 626,769.

This invention relates to improvements in multifocal ophthalmic lenses, and has particular reference to trifocal lenses and a novel method of producing the same.

One object of the present invention is to provide a multifocal lens having a portion suitable for distance vision, another portion suitable for near vision, and a third portion suitable for intermediate vision.

Another object is to provide a multifocal lens wherein the distance portion and intermediate portion are produced by differently curved surfaces in a single piece of glass, and a near vision portion is produced by a glass insert within the area of the intermediate portion, said insert being of a different refractive index.

Another object is to provide a lens blank target from which a plurality of lenses may be cut.

A further object is the provision of a new and improved process of producing multifocal lenses of this type.

Other objects and advantages of the invention will be apparent by reference to the following description taken in connection with the accompanying drawings and specifically pointed out in the appended claims.

In the drawings, wherein similar reference numerals designate corresponding parts throughout the several views, Figure I is a front elevation of a finished lens made in accordance with the invention.

Figure II is a vertical transverse sectional view on the line II—II of Figure I.

Figure III is a bottom plan view of a partially finished target blank used in the production of a plurality of lenses.

Figure IV is a view similar to Figure III after the grinding operations are complete.

Figure V is a similar view illustrating a modified form of the invention.

Figure VI is a bottom plan view of a blank used in the production of another modification.

Figure VII is a transverse sectional view on the line VII—VII of Figure VI.

The finished lens 11 comprises a distance field 12, a near vision field 13, and an intermediate vision field 14, substantially as illustrated in Figure I. The near vision field 13 is preferably of such a size and shape as to be tangent on its upper side with the line of intersection of the distant and intermediate fields, as at 15; while a portion 16 of the intermediate field underlies the near vision field.

In Figures III and VI, there is illustrated a preferred method of manufacture of the improved lens. Preferably a crown glass blank or target 17 in disc-shaped form is moulded, and which is provided with approximate optical surfaces, as shown in Figure VII. Spaced from the center, on the convex side of the disc, are countersunk recesses 18, ground and polished to true optical curves. Buttons or inserts 19 are then made of flint glass, having a higher refractive index than the target; the under side of these buttons is provided with an optical curve ground and polished to fit into the recesses 18. A button 19 is then inserted in each recess 18 and preferably fused in place, although they may be cemented or secured in any other suitable manner if desired. This operation is identical with that for making fused bifocals, which has been in use in this country for several years past.

After the fusing operation is complete, the blank is ground in the same manner as is used on ordinary one-piece bifocal lenses well known to those skilled in the art. An optical curve 20 is ground upon the opposite surface wherein the insert buttons 19 are countersunk. This curvature encircles but does not include the inserts, and in the center of the target. A second curve 21 of a different radius from the curve 20 is ground, as shown in Figure II. The grinding may be done on a cat-head having the distance and reading portions formed therein, and by spinning the blank on the cat-head the two curves may be formed simultaneously. In place of a cat-head the curve 20 may first be ground down by the use of a ring tool, as is common practice in the manufacture of solid one-piece bifocals. Then the inner portion may be ground and polished with ring tools, as now done on the reading portion of one-piece bifocals. A continuous curve 23 is then placed on the side of the blank on which the inserts are placed, said curve including the inserts and gives the desired prescription power to the lens.

After this grinding operation is complete, the blank may be cut upon a diametric line 22, as best shown in Figure IV. The finished lens 11 may then be cut out as shown in dot and dash lines in Figure IV.

It is to be understood that these radii may be varied for different combinations of power. These curvatures have been exaggerated in the drawings for the purpose of clearly differentiating between the two surfaces. The curve 21 may be positive, as shown, or it may be a negative curve of less negative power than the curve 20. The power of the upper portion 12 of the lens is the algebraic sum of the curves 20 and 23; this power is the distance vision correction, as in ordinary one-piece bifocals. The intermediate power is the algebraic sum of the curves 21 and 23. The power of the reading portion 13 is the composite of outer surface 23, the inner surface 21, and the surface of the recess 18 and insert 19, and the difference in the refractive index of the flint and crown glasses.

It is, of course, to be understood that any number of lenses may be produced from a single blank, there being no restriction to two. As shown in Figure V, three lenses may be conveniently manufactured at one time, or any greater number. In this case the blank, after grinding, will be split on the radial lines 24.

From the foregoing it will be seen that there has been produced a multifocal lens whereby the wearer will have the benefit of a distance vision correction, a near vision correction, and an intermediate vision correction, while the appearance is very much like that of the ordinary bifocal. The past bifocal lenses have been quite commonly used, but they have had the disadvantage of not including an intermediate portion. For example, a person wearing a bifocal lens is inconvenienced in going down stairs or in trying to see objects at an intermediate distance. In this new lens this objection to bifocal lenses has been overcome, and due to the fact that part of the intermediate portion is disposed below the reading portion, and part on each side, the intermediate vision correction is conveniently positioned at all times. The present result has been accomplished in a lens that can be easily manufactured and will be strong and serviceable.

It is to be understood that the present invention shall not be limited to what is shown and described herein, but that changes may be resorted to in the form and proportion and arrangement of parts, and the right is reserved to make such changes falling within the scope of the claims without departing from the spirit of the invention.

I claim:

1. The process of making a multifocal lens comprising surfacing one side of a glass blank to two concentric focal fields having different surface curvatures and an arcuate line of demarcation between them, recessing the opposite side of the blank in line with the central field to a curved optical surface the circumference of which is tangent to the arcuate line of demarcation of the concentric fields and the radius of the circumference less than that of the central field of the two concentric fields and the power of which is requisite to increase the magnification of the central field through an insert therein of a glass of different refractive index, surfacing an insert of glass of different refractive index to fit the curved recess, and securing the insert in the recess.

2. The process of making a multifocal lens comprising surfacing one side of a glass blank to two concentric focal fields having different surface curvatures and an arcuate line of demarcation between them, recessing the opposite side of the blank in line with the central field to a curved optical surface the circumference of which is tangent to the arcuate line of demarcation of the concentric fields and the radius of the circumference less than that of the central field of the two concentric fields and the power of which is requisite to increase the magnification of the central field through an insert therein of a glass of different refractive index, surfacing an insert of glass of a different index of refraction to fit the curved recess, securing the insert in the recess, and surfacing the recessed side to a curvature that will give the desired prescription power of the outer and central fields.

ALBERT B. WELLS.